United States Patent [19]
D'Antonio

[11] 3,840,827
[45] Oct. 8, 1974

[54] DIODE PHASE SHIFTING NETWORK

[75] Inventor: Nicholas F. D'Antonio, Liverpool, N.Y.

[73] Assignee: General Electric Company, Syracuse, N.Y.

[22] Filed: Nov. 5, 1973

[21] Appl. No.: 412,706

[52] U.S. Cl................. 333/31 R, 333/29, 333/31 A
[51] Int. Cl........................... H01p 1/18, H03h 7/18
[58] Field of Search.......... 333/29, 31 R, 31 A, 7 D; 307/293

[56] References Cited

OTHER PUBLICATIONS

White–"High Power P–I–N Diode Controlled, Microwave Transmission Phase Shifters" in IEEE Transactions on Microwave Theory and Techniques Vol. MTT13, March 1965, pages 233–242.

*Primary Examiner*—James W. Lawrence
*Assistant Examiner*—Marvin Nussbaum
*Attorney, Agent, or Firm*—Richard V. Lang; Carl W. Baker; Frank L. Neuhauser

[57] ABSTRACT

The present invention relates to a diode phase shifting network associated with an individual antenna element and suitable for incorporation into a phased array radar system. The phase shifting network herein described operates in response to one bit of a digital command signal. In association with like networks responsive to other bits of a command signal, a phase shifting element having a plurality of diode sets will produce a phase shift angle corresponding to multiple bit command data. Each network comprises a first silicon controlled rectifier (SCR) in a controlled current path which provides high forward current to a diode set. The first SCR is turned on by application of a control signal to its gate and turned off by anode current depletion effected by a transistor control. The network further comprises a second SCR in a self-extinguishing configuration. In response to a gate signal, the second SCR applies a large voltage, reversely poled with respect to the diode set to sweep out the stored charge therein and terminate conduction. The network is particularly economical and is capable of rapidly switching the diode set from one conductive state to the other, bringing about a correspondingly abrupt change in the phase shift angle produced.

3 Claims, 3 Drawing Figures

DIODE PHASE SHIFTING NETWORK

BACKGROUND OF THE INVENTION

1. Field of the Invention

The present invention relates to phase shift networks wherein the phase shift angle produced is a function of the state of conduction of a diode set established within a wave transmission structure. The invention also relates to networks designed to supply upon command either a forward, high current bias or an inverse high voltage bias to a diode set of a diode phase shifter and to rapidly convert from one state of energization to another to produce a correspondingly abrupt change in the phase shift angle produced.

2. Description of the Prior Art

Phase shifting devices employing one or more diode sets and networks for operating such phase shifting devices are well known. A typical diode phase shifter comprises between one and four diode sets arranged within a wave transmission structure with each set requiring a separate "driver" network. The diodes of each set are adapted to assume one of two states corresponding to one of two phase shift angles. The forward conduction state is one wherein the diodes develop a very substantial stored charge, the stored charge being sufficiently great so that it will not be depleted at any point in the cycle of an applied r.f. waveform but will permit diode conduction throughout. In the reverse bias condition, a very substantial inverse voltage is applied to the diode, the magnitude of the inverse voltage normally being selected so as to hasten depletion of stored charge from the diode set. This potential is also set well above the expected range of potentials developed by the applied r.f. waveform so that the diodes remain conductive at all times.

In large arrays, large numbers of similar phase shift networks are required. To produce two phase shift angles, a phase shifter may require a single diode set. When four phase shift angles are required, two diode sets may be required (per phase shifter). Where greater numbers of phase shift angles are desired, then correspondingly larger numbers of diode sets may be required. In system applications, a greater selection of phase shift angles permits the more versatile formation of a directional beam and provides more versatile scanning. Therefore in versatile systems, not only are a large number of phase shift angles desirable, but a very large number of individual antenna elements may be desired. In a typical systems application, an array of 100 by 100 elements, having 16 phase angles may require 40,000 identical shift networks. Because of the need for large numbers of identical networks, there is considerable need for an optimum phase shifting network for each diode set.

SUMMARY OF THE INVENTION

Accordingly, it is an object of the present invention to provide an improved command controlled diode phase shift network.

It is another object of the invention to provide an improved diode phase shift network responsive to one bit of a command signal.

It is a further object of the invention to provide a diode phase shift network improved rapidity of response to a command signal.

It is still another object of the invention to provide an improved diode phase shift network that is economical in design.

These and other objects of the invention are achieved in a novel phase shift network for operation of a single diode set in a phase shifter, the phase shifter being adapted to shift the phase of an applied radio frequency signal by an angle dependent upon whether the diodes in a set contain stored charge or are uncharged, corresponding respectively to a high or low conductance state. Means are provided for forward biasing the diodes to achieve charge storage comprising a source of low voltage, high current electrical energy and a first silicon controlled rectifier serially connected with the diodes in a controlled current path across said souce in the easy flow direction. Means are also provided for removing stored charge from said diode and preventing its accumulation under r.f. signal conditions, comprising a source of high voltage electrical energy, suitable for sweeping out stored charge and exceeding the potential of the applied radio frequency signals and a second silicon controlled rectifier serially connected with said diode across said high voltage source, the second silicon controlled rectifier being forwardly poled and said diode being reversely poled in respect to said high voltage source. First SCR control means are provided coupled to the anode of said first SCR in said controlled current path to provide normally on energization and coupled to its gate to provide a conduction inducing pulse at a predetermined first instant to initiate diode charging and at a predetermined second instant interrupting said normal energization and causing anode current depletion in order to turn off said first SCR. In addition, a second SCR control means is provided for coupling a conduction inducing pulse to its gate to turn it on shortly after the predetermined second instant, the charge stored in said diode permitting momentary conduction in its second SCR and causing self turn-off by anode current depletion when the diode is discharged.

In accordance with a further aspect of the invention, the first control means comprises a transistor serially connected between the first SCR and the high current source, the transistor being controlled by application of a signal to its base at said second instant to turn off said first SCR.

In accordance with still another aspect of the invention the first control means comprises a resistance, a capacitance and a transistor switch; its resistance being connected between the anode of the first SCR and the high current source and said capacitor having one terminal connected to the junction of the resistance and said anode and the other terminal being connected to the transistor switch. The transistor switch is then operated at the second instance to divert current into said capacitor causing current depletion in said first SCR at said second instant and causing it to turn off thereupon.

BRIEF DESCRIPTION OF THE DRAWING

The novel and distinctive features of the invention are set forth in the claims appended to the present application. The invention itself, however, together with further objects and advantages thereof may best be understood by reference to the following description and accompanying drawings in which:

DESCRIPTION OF THE PREFERRED EMBODIMENT

Figures 1, 3:
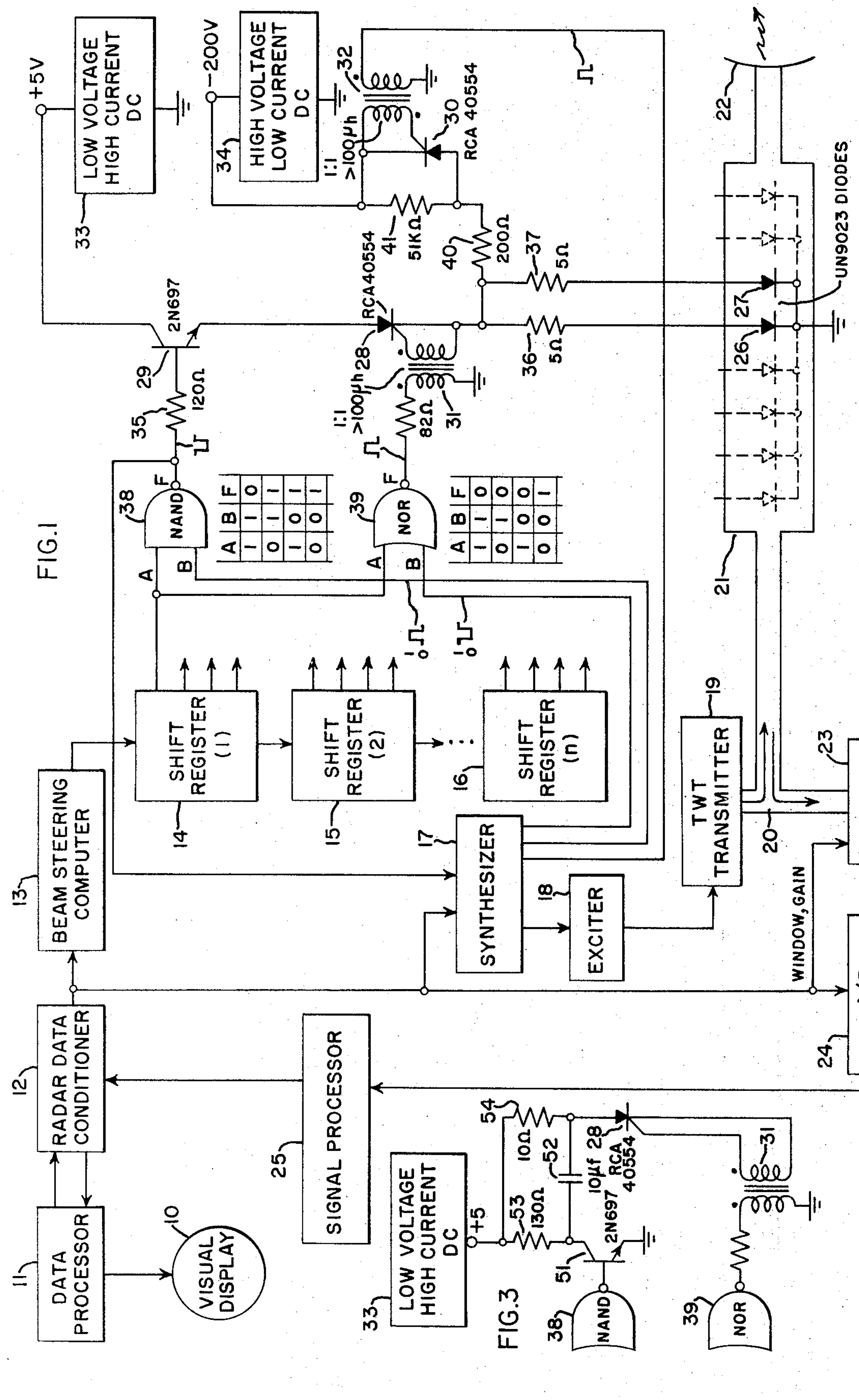
FIG. 1 is an illustration partially in block diagram form and partially in circuit diagram form of a phased array radar system incorporating a phase shift network in accordance with a first embodiment of the invention.
FIG. 3 is a diagram of a second embodiment of the invention.

Referring now to FIG. 1, there is shown a phased array radar system incorporating a plurality of diode phase shifters employing drivers in accordance with the invention. A phased array radar system is a target location system in which a beam of radio energy is directed toward a target and an echo received, and which uses an antenna which is electrically, as opposed to mechanically, scanned. The antenna, which is normally used for both transmission and reception, is formed of a plurality of individually excited radiating elements disposed in a stationary array, the phase of the energy flowing out of and into each element of the array being controlled in such a manner as to synthesize a directional beam and to provide for its scanning.

The phased array radar system of FIG. 1 is of a generally conventional configuration. It comprises a data processor 11 which is the central control system computer and to which target data such as azimuth, elevation and range is continuously supplied. The interface between the central control system computer 11 and the radar is provided by a radar data conditioner 12 which in turn feeds data into the beam steering computer 13. The beam steering computer is designed to provide the electrical values to the phase shifters for individual elements of the array in performance of the scanning function. It also provides reference timing. The output of the beam steering computer 13 is supplied to a series of "N" registers 14, 15 and 16, each assigned to an element of the array, the illustrated series of shift registers being a single row, or a block of elements, in the array. Other series of shift registers corresponding to other portions of the array are not illustrated, but would be present in the total system. The radar data conditioner 12 is also coupled to a synthesizer or waveform generator 17 which establishes the transmitted pulse width and triggers the exciter 18 used to drive the traveling wave tube transmitter 19. The transmitter 19 is shown coupled by a waveguide through a directional coupler 20 and a diode phase shifter 21 to an individual array element 22. The diode phase shifter 21 has a plurality of diode sets of which all but one set (26, 27) are shown in a dotted outline for providing a plurality of phase shift angles.

A conventional array may be quite large, using many of the same kind of elements. It must be organized for efficient distribution and collection. A conventional array may have a large number of radiating elements as, for instance, 100 × 100 or 10,000 elements. Each array element has its own phase shifter and a separate driver for each diode set in that phase shifter. Directional couplers, which are a part of the power distribution network, are normally shared with other elements of the array. During transmission, the power distribution network (not shown) distributes the power available at high power levels at the transmitter to the individual array elements which operate at relatively low power. During reception, the power distribution network must be designed to collect the received signal from individual elements of the array and to apply it to the receiver (23) at a reasonably low signal to noise ratio.

The phased array radar system of FIG. 1 functions in a generally conventional manner. In transmission, the transmitting pulse passes successively through elements 19, 20, 21 and 22. In reception, the return signal is coupled from the array element 22 to the phase shifter 21. The return signal is then directed through directional coupler 20 to a receiver 23.

Completing the operational description of the system, the receiver 23 demodulates the radar return received by the array and couples the demodulated signals first to an A/D converter 24 and then to a signal processor 25. The processor 25 couples the processed data to the radar conditioner 12, which couples the data to the data processor 11 so as to apply fresh target data on azimuth, elevation and range for updating the visual display, shown at 10.

The foregoing elements of the system may be of conventional design. The novelty of the system lies in the measures, which will now be described, for controlling the individual diode sets in a given phase shifter in accordance with information supplied to the shift registers 14, 15, 16.

The principal function of the diode driver circuit is to provide upon command either a forward bias which establishes a very substantial stored charge in a diode set or provides a very substantial inverse voltage which removes the stored charge from a diode set. The presence or absence of stored charge in a diode phase shifter produces a choice in the phase shift angle produced. For the system function to be properly performed, it is essential that the switching be rapid from one condition to the other. When a phase shifter is provided with a succession of diode sets as, for instance, the four sets (as illustrated in FIG. 1), then 16 phase settings may be made available from a given phase shifter, as a function of the electrical state of the four diode sets. In practice, smaller or larger numbers of diode sets may be employed in a single diode phase shifter to provide a smaller or larger number of settings.

The driver associated with the single diode set 26, 27 in the phase shifter 21 comprises as its principal components a NAND gate 38 and a NOR gate 39 forming the input logic, a first silicon controlled rectifier 28, a control transistor 29, a second silicon controlled rectifier 30, a pulse transformer 31 associated with the gate of the first SCR, and a pulse transformer 32 associated with the gate of the second SCR 30, a source 33 of low voltage, high current electrical energy suitable for providing a high forward current, and establishing a substantial stored charge in the diodes 26, 27, and a source 34 of high voltage, low current low impedance electrical energy suitable for providing a large reverse bias to the diodes, suitable for rapidly sweeping out the stored charge.

The components of the driver, deferring a consideration of the input logic, are connected as illustrated in FIG. 1. The driver components providing forward bias to the diode set are connected as follows. The control transistor 29 has its collector connected to the positive terminal of the high current, low voltage source 33 and its emitter connected to the anode of SCR 28. The base of transistor 29 is connected through resistance 35 to the F output of the NAND gate 38 of the input logic. The input junction is then designed to be forwardly biased, favoring transistor conduction when the output of the NAND gate is in the "1" state, and to be cut off, making the transistor nonconductive when the output of the NAND gate is in the "0" state. The cathode of the SCR is connected through a small resistance 36 to the anode of the first diode 26 of the diode set and through a second small resistance 37 to the anode of the diode 27, forming the second member of the diode set. The gate and cathode of the SCR 28 is connected to the second winding of the pulse transformer 31, whose primary is coupled to the F output of the NOR gate 39. The SCR 28 is designed to be turned on when the positive transient from the NOR output in going from "0" to "1" occurs. The SCR remains conductive until its anode voltage is withdrawn or its current reduced below the extinction value. The cathodes of the diodes 26 and 27 are grounded. The control transistor 29, the silicon controlled rectifier 28, and the diodes 26, 27 of the diode set are all connected in series in the easy flow direction across the source 33. Thus, when the control transistor 29 and SCR 28 are both conductive, a very low impedance path is provided to facilitate the flow of a very substantial current from the source 33 into the diode set 26, 27. Depending upon application, the magnitude of the current is normally on the order of 200 milliamperes per diode.

The remainder of the driver circuit provides a stored charge clearing reverse bias to the diode sets. The SCR 30 has its cathode connected to the negative terminal of the source 34 and its anode coupled through current limiting resistance 40, low resistances 36 and 37, respectively, to the anodes of diodes 26 and 27. Shunting the anode and cathode of SCR 30 is a large resistance 41. The gate and cathode of the SCR 30 is connected to the secondary of the pulse transformer 32. The primary of the pulse transformer is coupled to an output of the synthesizer 17. The SCR 30 and diode set 26, 27 are thus connected in series across the d.c. source 34, with the SCR 30 being forwardly poled and the diode set being reversely poled in relation to the source. When the SCR 30 is conductive, it provides a low impedance path shunting the resistance 41 for applying a reverse bias from source 34 to the diode set 26, 27 to sweep out stored charge.

The operation of the driver circuit will now be explained with reference to the diagram of FIG. 1 and the waveform of FIGS. 2a through 2k, which are plotted against a common time coordinate.

The command signal for setting the driver is continuously being developed in the beam steering computer 13 and periodically supplied to the individual shift register 14. It is then coupled from the shift register to the A inputs of the NAND gate 38 and NOR gate 39 which form a major part of the input logic of the driver. FIG. *2a* illustrates two full "radar" periods. As illustrated in FIG. *2a*, each radar period comprises an initial re-phasing interval of 15 microseconds or less followed by a 120 microsecond radiation/receive period. At the beginning of each re-phasing interval, the synthesizer 17 provides a pair of complementary transfer pulses as shown in FIGS. *2b* and *2c*, which are applied respectively to the B terminals of the NAND gate 38 and of the NOR gate 39. The complementary transfer pulses are timed to begin at the beginning of each re-phasing cycle and to terminate prior to the end of each re-phasing cycle. The NAND gate provides at its output terminal a "1" state normally. During the transfer pulse, however, and depending upon the input information, either a "0" or "1" state may be produced. The output for the NAND gate for two radar periods is illustrated in FIG. *2d.* In the first re-phasing interval, the A and B inputs of the NAND gate are respectively at a "0" and a "1" condition and provide a "1" output (the normal condition). In the second re-phasing interval, the A input and B input are both at a "1" condition to produce a "0" output condition during the transfer pulse. As will be shortly explained, the output of the NAND gate controls the control transistor 29 of the driver.

Figure 2:
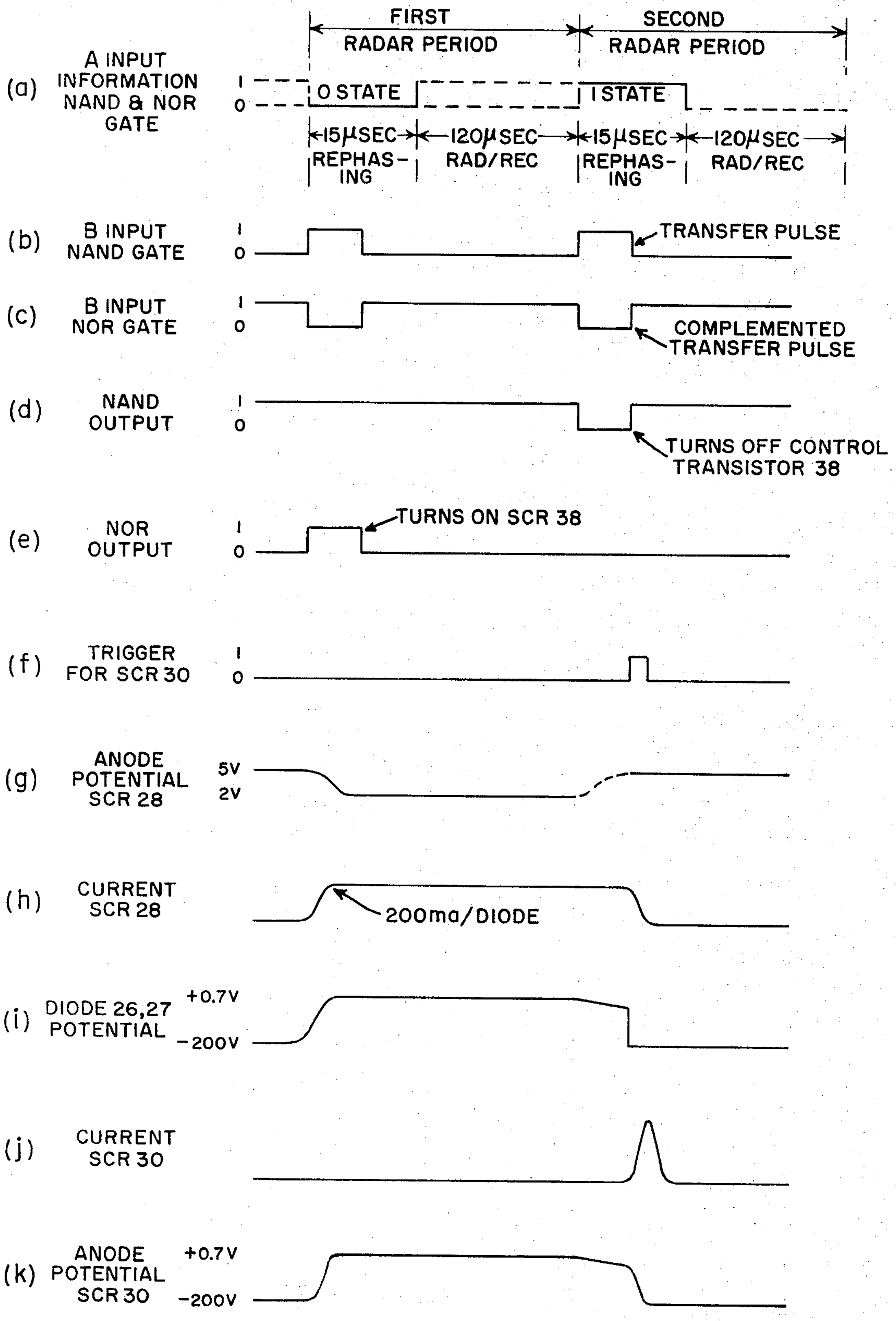
FIG. 2 presents wave shapes plotted against a common time abscissa explanatory of the operation of the invention.

The NOR gate 39, which forms a second input logic element of the driver, is likewise responsive to the command derived from the shift register 14. As noted above, the shift register output is applied to its A input terminal and the complementary transfer pulse illustrated in FIG. 2c is applied to its B input terminal. The output of the NOR gate for two radar periods is shown in FIG. *2e.* The NOR gate produces at its output a "0" output normally, except that during the transfer pulse, depending upon the input information, either a "0" or "1" output state is available. In FIG. *2e*, a "0" input is applied to both the A and B inputs of the NOR gate in the first re-phasing interval, to produce a "1" output state during the transfer pulse. During the second rephasing interval, the A input of the NOR gate is a "1," while the B input is a "0" resulting in an output of "0" (the normal condition). As will be shortly explained, the output of the NOR gate controls the SCR 28.

The input control logic for the driver is completed by means for controlling the SCR 30. As illustrated, the output of the NAND gate 38 is coupled backinto the synthesizer 17, which is provided by a positive transient sensor, typically a one shot multivibrator which provides a trigger pulse timed to respond to the positive going trailing edge of the NAND gate output pulse occurring prior to the end of the second re-phasing interval. The trigger pulse so produced as illustrated in FIG. 2f and consists of a relatively short duration pulse (typically one or two microseconds) designed to turn on the SCR 30.

The driver functions in the following manner under the influence of information applied to the input control logic from the shift register. Let us assume "0" state input information from the shift register for the first radar period. As illustrated in FIG. *2a*, the rephasing interval of the first radar period is entered with the input junction of the control transistor 29 in a forward biased condition and the SCR 28 gate in an off condition. A graph of the anode potential of SCR 28 is illustrated in FIG. *2g.* The presence of "0" state information on the A input line of the NAND gate 38 throughout the first re-phasing interval provides a continuing "1" condition throughout the first radar period at the output of the NAND gate. Thus, the input junction of the transistor 29 responsive to the NAND gate output continues to be in a forward biased condition throughout the first radar period. The NOR gate, which was at a "0" output condition at the beginning of the re-phasing interval of the first radar period, is now transferred to a positive "1" condition, which continues for a substantial part of the first re-phasing interval. The output pulse (FIG. 2e) from the NOR gate 39 is applied through the pulse transformer 31 to the gate of the SCR 28, where at the moment when the re-phasing interval of the first radar period commences, the SCR 28 is triggered on. SCR 28 then continues to conduct throughout the first radar period irrespective of gate potential. FIG. 2g illustrates the anode potential of SCR 28. SCR 28 commences to conduct simultaneously with the transistor 29 (whose input junction is forward biased) and its anode potential falls from +5 volts to a lower value in the vicinity of +2.0 volts (corresponding to the forward drop in the SCR 28, the forward drop in diodes 26, 27 and the drop in resistances 36, 37). As illustrated in FIG. 2i, the forward current in the diode set 26, 27 climbs rapidly to approximately 200 milliamperes per diode under the forward bias now provided by the low voltage, high current source 33. The total process is completed in a few microseconds and the phase shifter quickly reaches a stable phase condition corresponding to "0" state input formation.

Assuming "1" state input information at the shift register 14 for the second radar period, a second phase condition is produced. As illustrated, the re-phasing interval of the second radar period is entered with the input junction of the control transistors biased on (FIG. 2d), and the SCR 28 conductive (FIG. 2g), but without a continuing conduction favoring potential applied to its gate (FIG. 2e). "One" state output information from the shift register 14 causes the NAND gate 38 to provide a "0" state output pulse (2d) at the beginning of the second re-phasing interval. The "0" NAND output provides a cut-off potential to the base of the control transistor, which cuts off its current. The cessation of current in transistor 29 extinguishes the SCR 28 whose anode potential may rise in an indeterminate fashion as conduction ceases (FIG. 2g). Cutting off SCR 28 terminates the forward current supplied to the diode set (2h). The NOR output remains in a zero condition throughout the second radar period consistent with retaining the SCR 28 in an off condition throughout. Well prior to the end of the second re-phasing interval, the NAND gate pulse (FIG. 2d) provides a positive going transient on its trailing edge. As previously noted, this transient is coupled back to the synthesizer 17, which creates a trigger pulse (2f) that is applied to the SCR 30. The SCR 30 thereupon becomes conductive for a short interval under the influence of the large (200 volt) inverse bias source 34. It rapidly discharges the stored charge in the diode set, and provides a sudden fall in diode potential (2i). The conduction period of SCR 30 is very short, as illustrated in FIG. 2j, and continues only until the charge is swept out from the diodes. When the stored charge is removed, the SCR 30 becomes nonconductive for lack of adequate holding current. At this point the phase shifter has reached a stable second phase condition corresponding to "1" state input information. The phase shifter is now ready for the onset of the subsequent radiation period. The time required for this discharge process is less than a microsecond, the exact value depending on the size of resistor 40 and the magnitude of the stored charge in diodes 26 and 27.

The foregoing driver circuit for a diode phase shifter is of high performance. The circuit is fast acting in both setting and unsetting the states of the individual diode sets. In consequence, the control action exerted over the phase shifters is also fast. Removal of the stored charge from the diode sets normally requires 200 or 300 microseconds without a low impedance discharge path. With the application of the inverse bais and discharge through the SCR as herein taught, the discharge period is normally reduced to less than a microsecond. The foregoing rapidity of operation in respect to an individual phase shifter makes the phase shifter driver suitable for large systems applications wherein the interval assigned to re-phasing is less than 15 microseconds.

The foregoing circuit also provides an economical solution to the driver network problem in systems requiring large numbers of such networks. In the present configuration, the control transistor need not be an expensive high voltage device as is more conventially used. The serially connected SCR (28) is capable of both high forward current and high inverse voltages. Its presence eliminates the need for exposing the control transistor to the high inverse potential used to clear the stored charge from a diode set. Thus, the low voltage transistor and the SCR are of substantially lower cost than a system transistor designed to meet both specifications.

The circuit parameters illustrated in FIG. 1 are exemplary and may vary from the indicated values dependent upon the application. In particular, the values (5 ohms) of resistances 36 and 37 are selected to limit and therefore set the forward bias current of the diodes 26 and 27. The value (200 ohms) of resistance 40 is chosen to limit the surge current when diode back bias is initiated for the protection of the SCR 30, primarily. It also limits the dv/dt cathode transient on SCR 28 to prevent false triggering. The value (51k) of resistance 41 is chosen to limit the current passed in the reverse bias circuit when in a forward biased condition. It should not exceed a value permitting normal leakage of the diodes, when in a reverse biased condition.

A second embodiment of the invention is illustrated in FIG. 3. In this embodiment, the control transistor 29 is replaced by an additional electronic switch 51, normally a low current transistor, a capacitor 52 and resistances 53 and 54. While system performance is altered by this substitution, there being timing constraints, the other system components may be generally as before.

As illustrated in FIG. 3, the output of the NAND gate 38 is applied to the base of the transistor 51 connected in emitter common, collector output configuration. The emitter of the transistor 51 is connected to ground and the collector is connected through a relatively low resistance (130 ohms) 53 to the low voltage, high current d.c. source 33. The collector of the transistor 51 is also connected to one terminal of the capacitor 52. The other terminal of the capacitor 52 is connected to the connection between serial resistance element 54 and the anode of SCR 28. Capacitor 52 is selected such that when the transistor 51 is nonconductive, the capacitor 52 is discharged by leakage through the series path provided by resistances 53 and 54. When the NAND gate produces a conduction inducing pulse, transistor 51 becomes conductive, effectively earthing the collector connected terminal of capacitor 52, and momentarily depriving the SCR 28 of holding current so as to extinguish it. In this manner, the function of the high current control transistor 29 may be performed by the lower cost transistor 51 having even lesser performance requirements and the capacitor 52. The capacitor 52 however, must be of substantial size so that the two configurations are of comparable economic merit.

In both the FIG. 1 and the FIG. 3 embodiment, the SCR 28 is connected in a controlled current path, which provides anode current when SCR conduction is desired, but when SCR conduction is not desired, the current is momentarily controlled to extinguish the device. When the transistor 29 is used, its base potential is reduced, to reduce conduction in SCR 28, and thereby reduce the available anode current below the holding value. When the capacitor 52 and associated transistor switch 51 are used, the capacitor 52, upon being earthed through transistor 51, diverts current into itself and away from the source 33 and SCR 28. It also forces extinction of SCR 28, momentarily reducing the anode current below the holding value.

In respect to the SCR 30, the device is operated in a self-extinguishing mode. It is biased on by application of a large voltage from the source 34, but conduction can only continue while stored charge is being swept out of the diode sets 26, 27. When that charge is depleted, the SCR extinguishes itself. From the above, it may be seen that both SCR turn-on and turn-off has been achieved in a particularly simple and efficient manner.

While SCR anode current depletion has been illustrated in both FIGS. 1 and 3 as being achieved by a base controlled transistor devive, it should be recognized that the transistor device may either take the form of a common junction transistor or a MOSFET provided adequately high forward conduction is available. MOSFETS are however, normally of lesser desirability than junction transistors because of cost. The reactive element which has been disclosed as a capacitor is preferable over an inductor, which might be introduced with suitable circuit modification. Cost considerations and higher current drain make the inductor less desirable.

Suitable diode sets for the application herein described are called "PIN diodes," the letters denoting heavily P doped semiconductor material, heavily N doped semiconductor material and an intervening undoped intrinsic (I) layer in which charge is stored. Other diodes in a variant configuration, but possessing a comparable charge storage phenomenon, which increases the conductance of the device in respect to an applied r.f. signal when forward biased, could also be used.

What I claim as new and desire to secure by Letters Patent of the United States is:

1. A diode phase shifting network comprising:

a. a diode phase shifter having at least one charge storing diode and a wave transmission structure in which said diode is installed, said phase shifter being adapted to shift the phase of an applied radio frequency signal by an angle dependent upon whether said diodes contain stored charge or are uncharged, exhibiting respectively a high or low conductance state, b. means for forward biasing said diode comprising a source of low voltage, high current electrical energy suitable for charge storage, and a first silicon controlled rectifier serially connected in the easy flow direction with said diode in a controlled current path across said source, c. means for removing stored charge from said diode and preventing charge accumulation under r.f. signal application, comprising a source of high voltage electrical energy suitable for sweeping out stored charge and exceeding the potential of said applied signal, and a second silicon controlled rectifier serially connected with said diode across said high voltage source; said second silicon controlled rectifier being forwardly poled and said diode being reversely poled in respect to said high voltage source;

d. first silicon controlled rectifier control means coupled to the anode of said first silicon controlled rectifier in said controlled current path to provide normally on energization and coupled to the gate thereof to provide a conduction inducing pulse at a predetermined first instant to initiate diode charging; and at a predetermined second instant interrupting said normal energization and causing anode current depletion in order to turn off said first silicon controlled rectifier, and e. a second silicon controlled rectifier control means for coupling a conduction inducing pulse to the gate thereof to turn on said second silicon controlled rectifier shortly after said predetermined second instant, the charge stored in said diode permitting momentary conduction in said second silicon controlled rectifier and causing self turn-off of said second silicon controlled rectifier by anode current depletion when said diode is discharged.

2. The combination set forth in claim 1 wherein said first control means comprises a transistor serially connected between said first silicon controlled rectifier and said source, said transistor being controlled by application of the control signal to the base thereof at said second instant to turn off said first silicon controlled rectifier.

3. The combination set forth in claim 1 wherein said first silicon controlled rectifier control means comprises a resistance, a capacitance and a transistor switch, said resistance being serially connected between said silicon controlled rectifier and said high current source, said capacitor having one terminal connected to the junction of said resistance and said silicon controlled rectifier and the other capacitor terminal being connected to said switch, said switch being operable at said second instant to divert current into said capacitor causing current depletion of said first silicon controlled rectifier and causing it to turn off.

* * * * *